United States Patent [19]
Lloyd et al.

[11] 4,103,285
[45] Jul. 25, 1978

[54] VEHICLE ANTI-THEFT ALARM SYSTEM

[76] Inventors: William Lloyd; Geoffrey John Lloyd, both of The Alamo Powder Works La., Melling, Liverpool; David Dawson, 14 Thorndale Rd., Waterloo, Liverpool, all of England

[21] Appl. No.: 748,350

[22] Filed: Dec. 7, 1976

[51] Int. Cl.² .............................................. B60R 25/10
[52] U.S. Cl. .................................. 340/65; 340/309.1; 307/10 AT; 340/529; 340/566
[58] Field of Search ................... 340/63, 64, 65, 276, 340/274 R, 309.1; 307/10 AT; 180/114

[56] References Cited
U.S. PATENT DOCUMENTS

| | | | |
|---|---|---|---|
| 3,656,100 | 4/1972 | Beltrami | 340/63 |
| 3,968,474 | 7/1976 | Danahey | 340/63 |

*Primary Examiner*—Alvin H. Waring
*Attorney, Agent, or Firm*—Beveridge, DeGrandi, Kline & Lunsford

[57] ABSTRACT

An alarm system for a vehicle or trailer, the system comprising an alarm circuit which is energizable after a predetermined time period responsively to actuation of a control circuit of the system, and switch means for controlling the operating state of the control circuit.

23 Claims, 8 Drawing Figures

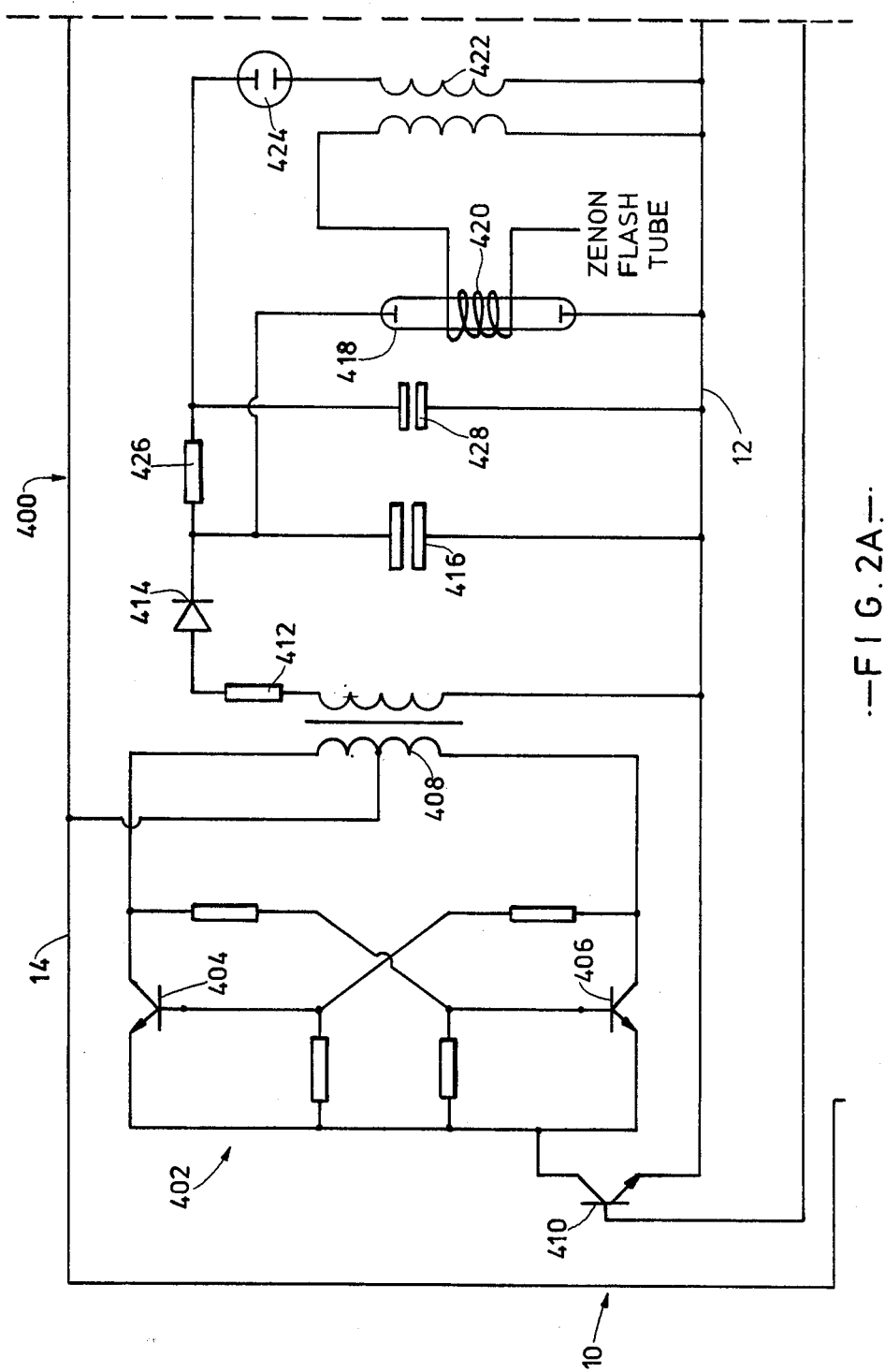
-FIG.2A-

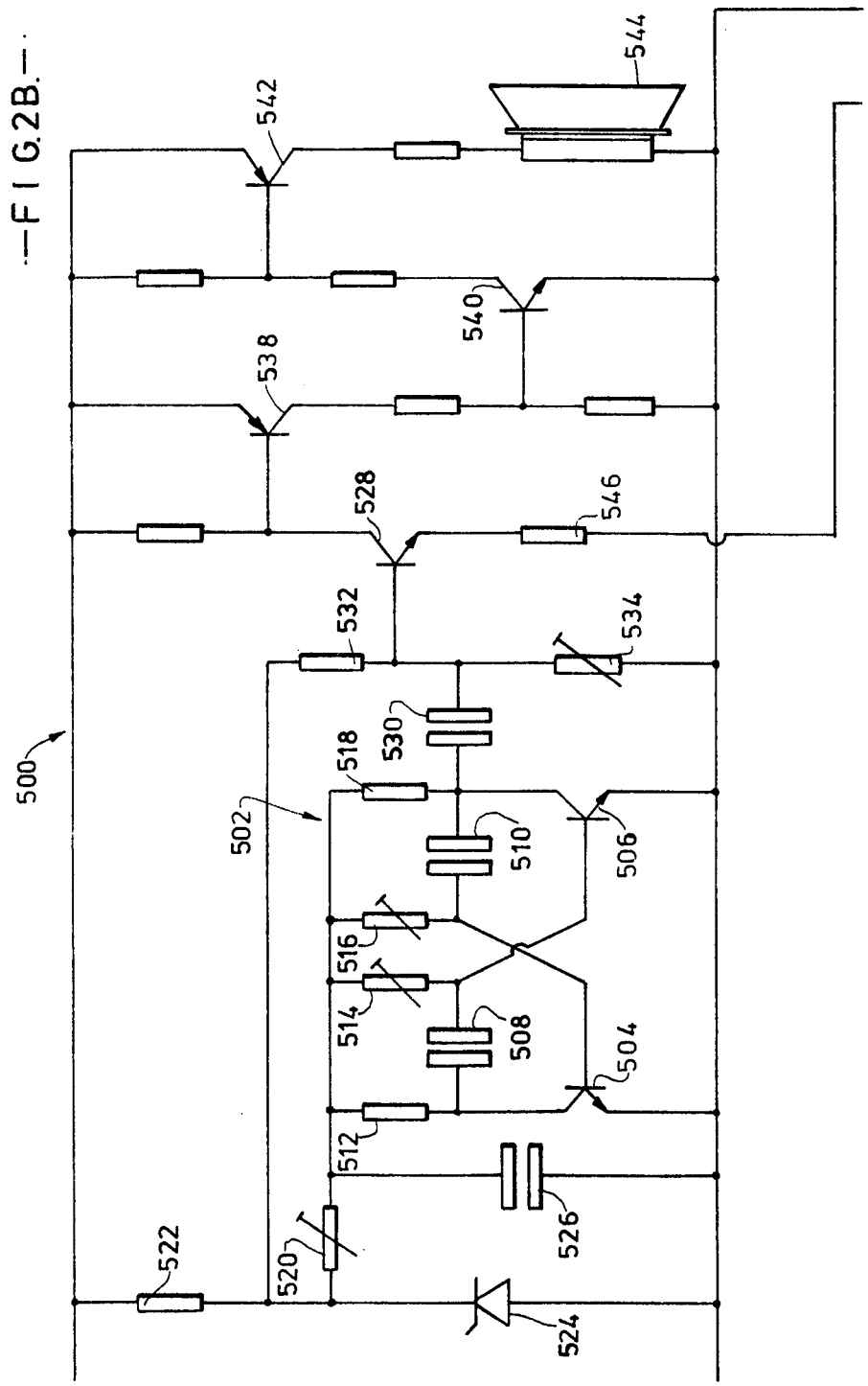
—FIG 2B.—

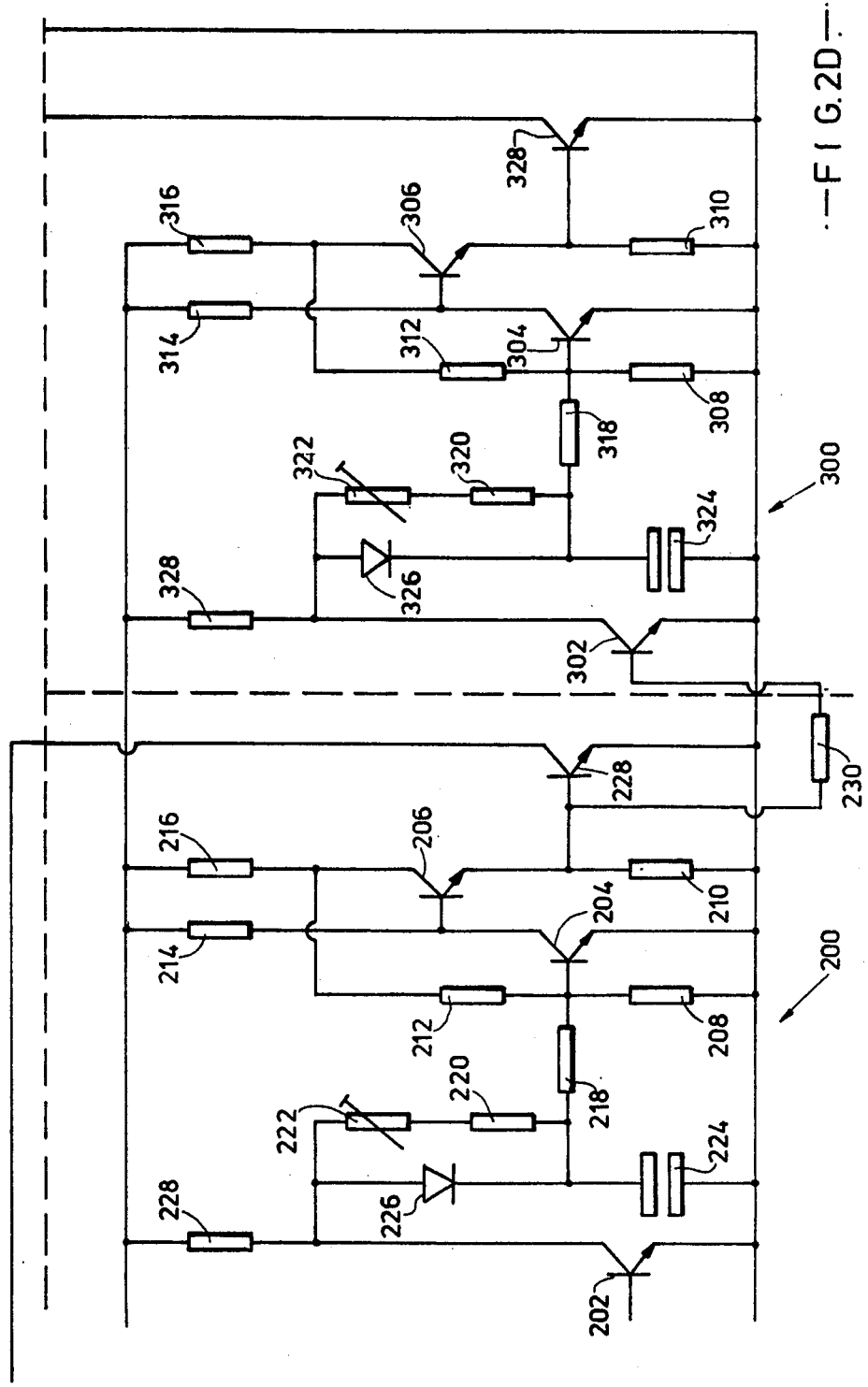

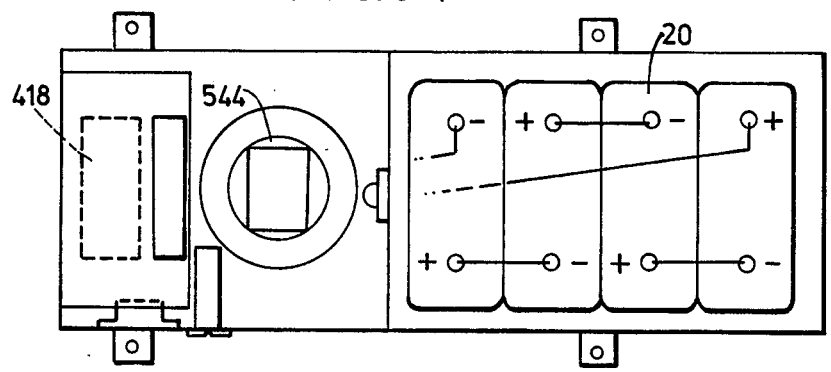
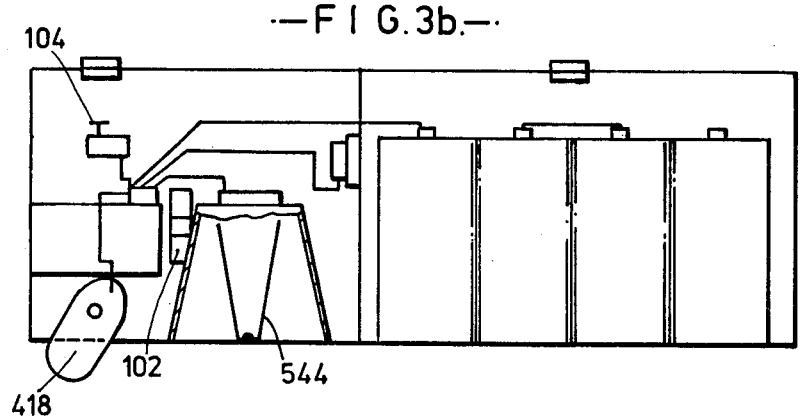
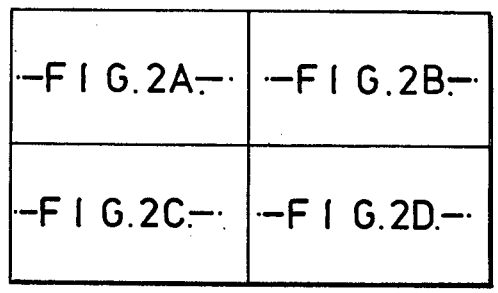

VEHICLE ANTI-THEFT ALARM SYSTEM

The present invention relates to alarm systems particularly for commercial vehicles and/or trailers.

With hitherto known alarm systems for vehicles and vehicle-trailer combinations any attempt by a thief to break into a vehicle or remove a trailer fitted with such an alarm system immediately activates an alarm (generally the vehicle horn or lights), the intention being to force the thief to abandon his attempt. However, when attempting to steal a vehicle or trailer the thief will normally choose a time and place most suited to his purpose and provided with a reasonable means of escape should this prove necessary. Obviously, the thief will, if possible, choose a time and place where the activation of an alarm will draw as little attention as possible, to allow the thief sufficient time to disconnect the alarm and drive the vehicle or trailer away without being caught.

An object of the present invention is to provide an improved form of alarm system with advantages over the hitherto known systems.

In accordance with the present invention there is provided an alarm system for a vehicle or trailer, the system comprising an alarm circuit energizable after a predetermined time period responsively to actuation of a control circuit of the system, and switch means for controlling the operating state of the control circuit.

Advantageously the switch means comprises a vibration sensor which is actuable responsively to vibration thereof to actuate the control circuit when the latter is armed, and control switch means for arming and disarming the control circuit.

In one embodiment of the invention the control switch means has a plurality of selectable switching states, a first of which serves for arming the control circuit, a second of which serves for disarming the control circuit, and a third of which serves for actuating the control circuit.

Advantageously the switch means comprises a plurality of switches and each said switching state is set by a combination of switching states of the plurality of switches. The switching of the control switch means into the second switching state by actuation of the plurality of switches in a predetermined manner serves to disarm the control circuit, and by actuation of said plurality of switches in a manner other than in the predetermined manner serves to arm or actuate the control circuit.

An alarm system according to the present invention has the advantage that it delays the energization of the vehicle or trailer alarm, thus giving the thief the impression that no alarm is fitted, and causing panic once the alarm is energized. The delay will be sufficient to give the thief time to join the normal traffic flow thus adding impetus to the effect of the alarm and quickly drawing attention to the vehicle or trailer.

The present invention is further described hereinafter, by way of example, with reference to the accompanying drawings, in which:

FIG. 1 is a block diagram of a preferred form of alarm system according to the present invention;

FIGS. 2a, 2b, 2c and 2d, when positioned as depicted in FIG. 4 provide a circuit diagram of the system of FIG. 1;

FIG. 3a is a plan view of one form of layout for the system of FIG. 1;

FIG. 3b is a side elevation of the layout of FIG. 3a; and

FIG. 4 depicts the positioning of FIGS. 2a, 2b, 2c and 2d to provide the circuit diagram of the system.

The illustrated alarm system is primarily intended for use on commercial vehicles or vehicle trailers to provide protection for the valuable loads often carried by these vehicles.

Figure 1:
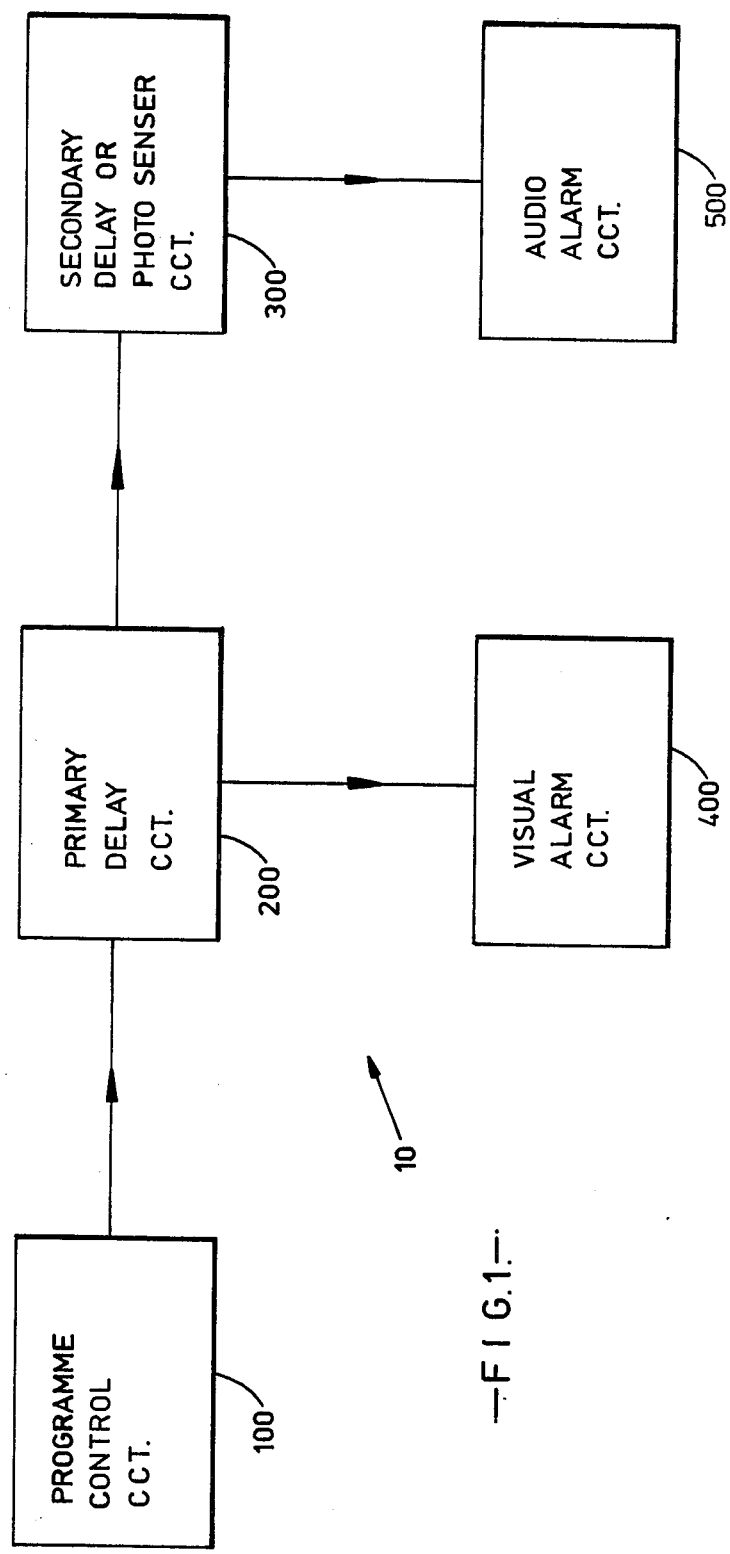
Figure 2C:
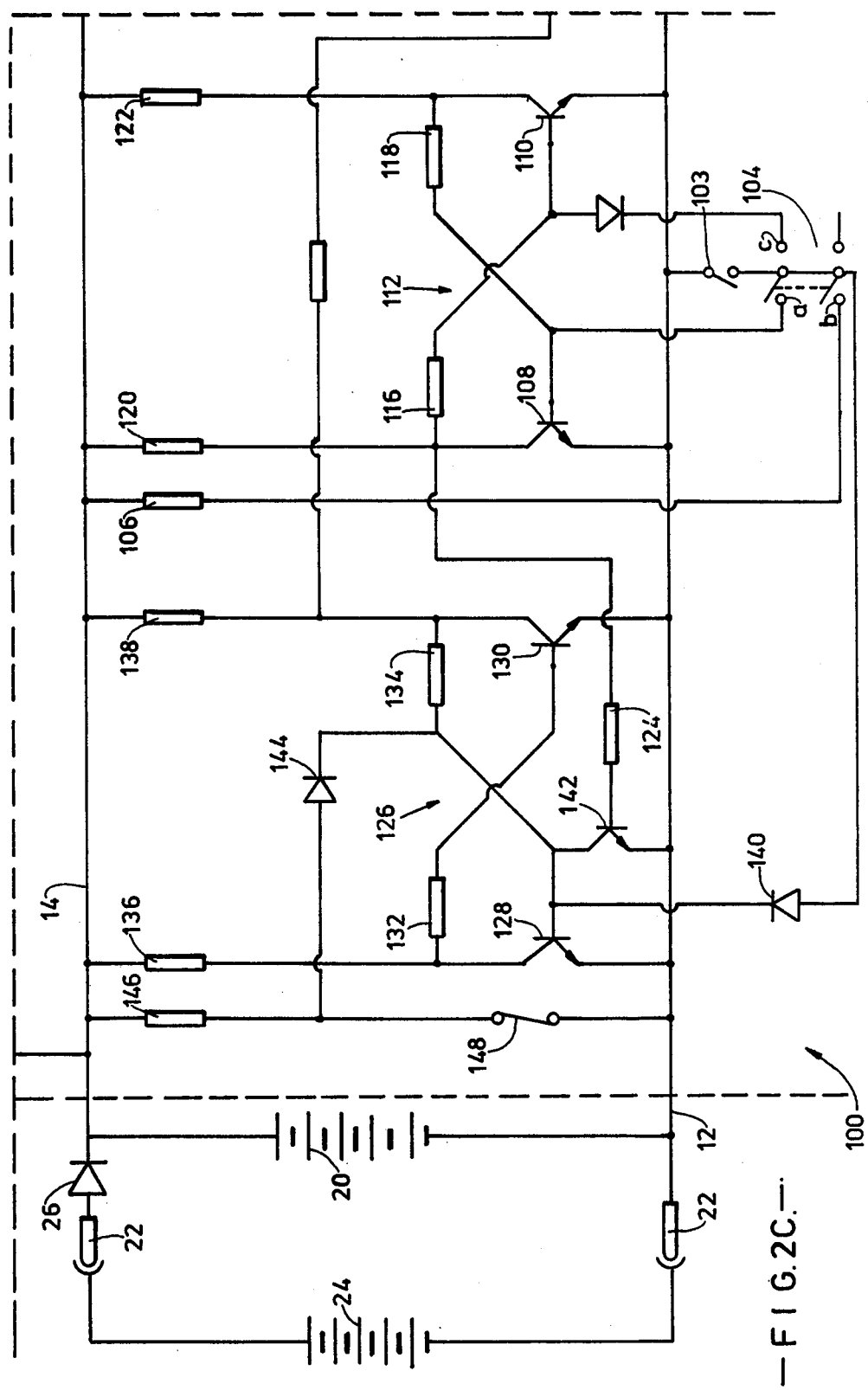

The alarm system 10 illustrated in block form in FIG. 1 has a control circuit 100 which controls the triggering of visual and audio alarm circuits 400 and 500 via respective time delay circuits 200 and 300. Circuit 300 may alternatively be a photo sensor circuit as further described below.

FIGS. 2a, 2b, 2c and 2d show the system circuitry when positioned as depicted in FIG. 4. The control circuit 100 includes control switch means as a single pole single throw switch 102 connecting a negative voltage supply line 12 of the system to the ganged switching arms of a double pole double throw switch 104. The latter has a central "off" position and with the switch 102 serves for arming and disarming the system. The switch 104 has two pairs of fixed contacts but in the present system only three contacts 104a, b and c are used. One contact 104b of one pair is connected to a positive voltage supply line 14 via a resistor 106. The remaining contacts 104a and 104c are connected to the control electrodes (bases) of respective transistors 108, 110 of a first switching circuit 112, the contact 104c via a diode 114. The emitter of the two transistors 108, 110 are directly connected to the negative supply line and their bases and collectors are interconnected by way of resistors 116, 118 in the manner of a multivibrator circuit. The collectors of the two transistors 108, 110 are further connected to the positive supply line via respective resistors 120, 122.

The output of the transistor 108 is applied via a resistor 124 to a second switching circuit 126 which includes two transistors 128, 130 whose control electrodes (bases) and collectors are also interconnected via resistors 132, 134 in the manner of a multivibrator circuit. Respective resistors 136, 138 serve as collector loads for the transistors 128, 130 whose emitters are directly connected to the negative line 12.

The base of the transistor 128 is connected to the switching arms of the switch 104 by way of a diode 140, to the negative line 12 via the collector-emitter path of a transistor 142 to whose base the resistor 124 is series connected, and to the positive line 14 through a series combination of a diode 144 and resistor 146. The junction between the diode 144 and resistor 146 is connected to the negative line 12 by way of a normally closed inertia switch 148 which may be in the form of a mercury tilt switch or pendulum switch.

The control circuit 100 controls the primary delay circuit 200 through a transistor 202 of the latter, the control electrode (base) of the transistor 202 being connected to the output of the transistor 130 through a resistor 150. The delay circuit 200 includes a schmitt trigger which in turn controls the visual alarm circuit 400 by way of a transistor 228. The schmitt trigger comprises transistors 204, 206 and resistors 208 to 216 and actuates the visual alarm circuit when the control circuit 100 switches the transistor 202 into its conductive mode. However, for reasons hereinafter explained the schmitt trigger is connected to the collector of the transistor by way of a timing circuit which delays triggering of the schmitt trigger for a period of between 0 and 15 minutes after the transistor 202 is rendered conductive.

The timing circuit includes three series resistors 218, 220 and 222 and a shunt capacitor 224 connected to the junction of resistors 218 and 220. The capacitor 224 is further connected via a diode 226 to the collector of transistor 202 which in turn is connected by way of a resistor 228 to the positive line 14.

With the transistor 202 off the capacitor 224 is charged via diode 226 almost to the potential of the supply line 14 and the voltage on the capacitor 224 is applied to the base of the transistor 204 to maintain the schmitt trigger in a first switched state and thus the visual alarm circuit 400 deactivated. When the transistor 202 is switched on by the control circuit 100 it reverse biasses the diode 226 and allows the capacitor 224 to discharge. Eventually the voltage on the latter drops sufficiently to switch the schmitt trigger into its second state, thus activating the visual alarm circuit 400. The discharge time of the capacitor 224 can be varied by means of the resistor 222, the latter being a variable resistor, and lies in the range 0 to 15 minutes.

The secondary delay circuit 300 is similar to the primary delay circuit 200 and serves the same function with respect to the audio alarm circuit 500. However, since the input transistor 302 of the secondary delay circuit 300 is connected via resistor 230 to the output of the schmitt trigger of the primary delay circuit 200 so as to be triggered thereby, the time delay before the audio alarm circuit 500 is activated following switch-on of transistor 202 is equal to the sum of the time delays set by the two delay circuits 200 and 300.

In normal use of the vehicle and/or trailer on which the system is installed the latter is disarmed. This is effected by first closing switch 102 to connect the ganged switch arms of switch 104 to the negative line 12 (switch 104 being in its "off" state), and then closing the switch arms to contacts 104a and b of the switch 104. This holds the transistor 108 permanently off by short circuiting its base-emitter junction and thereby prevents the transistor 202 from being switched into its conductive state. By virtue of its connection to transistor 128 via the transistor 142, the transistor 108, when non-conductive, holds transistor 128 off. This last holds transistor 130 on, which in turn holds the transistor 202 off. The audio and visual alarm delay circuits 200 and 300 are therefore rendered inactive.

However, if either of the switches 102 and 104 is tampered with by switch 102 being opened or switch 104 being switched to either of its two other switched states, the alarm system will be armed or triggered. If switch 102 is opened while switch 104 remains with its switch arms closed to contacts 104a and b the bases of both the transistors 128 and 108 are connected to the positive line 14, the transistors thus switching the transistor 202 into its conductive state, to sequentially activate the delay circuits 200 and 300.

To arm the system, switch 104 is switched into its central "off" position or to contact 104c. The system can then be activated either by tampering with the switches 102, 104 or by undue vibration of the trailer or vehicle on which the system is installed. Upon such undue vibration, e.g. when trailer and towing vehicle are being connected, the inertia switch 148 opens to allow the transistor 128 to be turned on via the diode 144 and resistor 146. This in turn turns transistor 130 off and transistor 202 on, triggering the schmitt trigger of the delay circuit 200 and activating the visual alarm circuit 400 and the secondary delay circuit 300 after the predetermined time delay. The latter allows time for trailer and towing vehicle to be connected together and driven off a few hundred yards before the visual alarm circuit is activated.

The visual alarm circuit 400 has an alarm actuator which includes an astable multivibrator 402 having two transistors 404, 406 each of which has a respective half of the primary winding of a transformer 408 as a collector load. The centre tap of the primary winding is connected to the line 14. The two emitters of the transistors 404, 406 are connected to the line 12 via the collector-emitter path of a transistor 410 whose conductive state is controlled by the transistor 228 of the delay circuit 200. When the latter is activated by the control circuit 100 and after the time delay set by the capacitor 224 the schmitt trigger switches the transistor 410 on via the transistor 228 to energise the multivibrator 402. The emitters of the two transistors 404, 406 are alternatively directly connected to the line 12 and the transistor 410 is connected in the positive supply line to the transformer centre tap.

The transformer 408 is a step-up transformer having a turns ratio of the order of 40:1. Its secondary winding is connected by way of a series resistor 412 and rectifier diode 414 and a shunt smoothing capacitor 416 to a gas discharge tube 418 of the type having a field coil 420 which is energised to fire the tube 418. Power for the field coil 420 is also derived from the voltage rectified by the diode 414 by way of a further transformer 422 whose secondary winding is connected to the field coil 420 and whose primary winding is connected through a series gas discharge device 424 and resistor 426 to the junction of the diode 414 and tube 418. An additional smoothing capacitor 428 connects the junction of the resistor 426 and gas discharge device 424 to the line 12. The transformer 422 has a typical step-up turns ratio of 20:1 and the gas discharge device 424 is for example a neon tube with a predetermined breakdown voltage.

The alternating voltage generated by the multivibrator 402 is stepped up by the transformer 408 and rectified by the diode 414 to be applied across the tube 418 and the capacitor 428.

The voltage which builds up on the latter as it is charged through the resistor 426 is applied to the discharge device 424 until the device 424 breaks down and discharges the capacitor 428 through the primary winding of the transformer 422. The stepped-up voltage pulse thus generated in the transformer secondary is applied to the field coil 420 momentarily to fire the tube 418. Once the capacitor 428 has discharged sufficiently the discharge device 424 switches off, allowing the capacitor 428 to recharge for the next firing cycle of the tube 418.

As an alternative to the gas discharge device 424 the primary winding of the transformer 422 can be controlled by a triac which is triggered by an astable multivibrator.

As is described above, triggering of the schmitt trigger of the primary delay circuit 200 activates the secondary delay circuit 300 which in turn, after a suitable delay set by its timing circuit, activates the audio alarm circuit 500.

The audio alarm circuit 500 has an alarm actuator, basically a varying pitch oscillator 502 in the form of an astable multivibrator, connected to an audio alarm 544, for example a horn loudspeaker. The oscillator has two transistors 504, 506, two capacitors 508, 510 and four resistances 512 to 518, and is connected by way of a variable resistance 520 to a stabilized supply voltage derived from the positive supply line 14 by a series resistor 522 and zener-diode 524. The resistances 514 and 516, connecting the bases of the transistors 504 and 506 to the resistance 520, are preferably variable.

The oscillator also has a capacitor 526 connecting the resistance 520 to the lead 12. This capacitor 526 serves as a recharging and discharging battery for the multivibrator enabling the latter to operate in a periodic manner. When the capacitor 520 is discharged the multivibrator is inoperative and remains so while the capacitor 526 charges via the resistor 520. Once the voltage across the capacitor 526 attains a specific value, the multivibrator becomes operative and applies an oscillating signal to the base of transistor 528 via a coupling capacitor 530. However, once the multivibrator begins to operate capacitor 526 discharges via the transistors 504, 506 until the voltage across the capacitor 526 drops to a level at which the multivibrator ceases to operate. The charging cycle of the capacitor then recommences, the period being determined by resistor 520. During discharge of the capacitor 526 the frequency of oscillation of the multivibrator gradually drops, the centre frequency preferably being about 1250 Hz.

Resistors 532, 534 serve as a bias chain for the transistor 528 whose collector is coupled by way of an amplifier including transistors 538, 540 and 542 to an audio warning device 544 for example a horn or siren.

The emitter of the transistor 528 is connected to the collector of transistor 328 via a resistor 546 so that while the circuit 300 is inactive the transistor 528 is maintained in a non-conductive state thus preventing the device 544 from being sounded by the oscillator multivibrator. However, once the schmitt trigger of circuit 300 switches on the transistor 528 via the transistor 328, the device 544 is energized by the oscillator 502 to provide a repetitive audible signal of varying pitch.

The transistor 328 can alternatively control a power transistor or other switch in a positive supply line to the oscillator 502 so that the latter is energized or unenergised depending on the conductive state of the transistor 328. In this case the resistor 546 connects the emitter of the transistor 525 to the line 12.

FIGS. 3a and 3b show one form of layout for the system. The latter is preferably in the form of a self-contained unit, all parts being mounted in a metal housing of robust construction, with that portion covering the tube 418 being of unbreakable glass or plastics. The unit is preferably located on the trailer in a relatively inaccessible place to deter tampering. It is also advantageous if the location of the unit is such that light from the tube 418 is not visible to the driver of a vehicle to which the trailer is connected. Thus a thief would be completely unaware that an alarm system had been activated until the audio alarm 544 was sounded.

A further advantage of the alarm system is that once activated, the switching off of transistor 202 does not immediately deactivate the visual alarm circuit 400, since the schmitt trigger of the primary delay circuit 200 is not switched back into its first switched state until the capacitor 224 has recharged sufficiently through the diode 226 and resistor 228. The timing circuit of the secondary delay circuit 300 acts in a similar manner thus providing an additional delay before the audio alarm circuit is deactivated.

Although the secondary delay circuit 300 of the described embodiment is triggered by the schmitt trigger of the primary delay circuit 200, it may alternatively be directly connected to the output of the control circuit 100.

The secondary delay circuit 300 may be replaced by an optical sensor circuit which monitors the operation of the tube 418 when it is flashing and in the event of a malfunction of the latter will immediately activate the audio alarm circuit. Thus the blacking out of the tube 418 will bring the audio alarm circuit immediately into play.

The two supply lines 12 and 14 are connected directly to a battery 20 which serves as an independent power supply of the system, and by way of connectors 22 to the vehicle battery 24. The lead 14 includes a forward biassed diode 26 which prevents shorting of the connectors 22 from affecting the system. The supply voltage is generally between 6 and 30 watts.

Finally, the switch 104 may be in the form of a combination or key switch to provide additional security.

We claim:

1. An alarm system for a vehicle or trailer comprising:
    input means adapted for connection to an electrical power source;
    time delay means having an input and an output for applying electrical power to said output after electrical power has been applied to said input for a preset time;
    a vibration-responsive switch coupled to said time delay means input and to said input means and responsive to vibration for coupling said time delay means input to said input means; and
    a first alarm circuit connected to said time delay means output and adapted for connection to a first alarm device for applying electrical power from said time delay means output to the first alarm device.

2. A system as claimed in claim 1 further comprising control switch means connected to said time delay means and capable of alternatively assuming an armed position, in which said time delay means is enabled to apply electrical power to said time delay means output after electrical power has been applied to said time delay means input for the preset time, and a disarmed position, in which said time delay means is disabled.

3. A system as claimed in claim 2 in which said control switch means is capable of alternatively assuming a third position in which said time delay means input is coupled to said input means by said control switch means.

4. A system as claimed in claim 3 wherein said control switch means comprises a plurality of switches and each of said positions of said control switch means is set by setting a combination of switching states of said plurality of switches.

5. A system as claimed in claim 4 wherein switching of said control switch means into said disarm position by actuation of said plurality of switches in a predetermined manner serves to disarm said time delay means, and by actuation of said plurality of switches in a manner other than in said predetermined manner serves to arm or actuate said time delay means.

6. A system as claimed in claim 1 further comprising an alarm device connected to said first alarm circuit and in which said first alarm circuit is triggerable to alternately energise and de-energise the alarm device.

7. A system as claimed in claim 6 wherein said first alarm circuit includes an astable multivibrator.

8. A system as claimed in claim 6 wherein the alarm device is a visual alarm.

9. A system as claimed in claim 1 further comprising a second alarm circuit connected to said time delay means output and adapted for connection to a second alarm device for applying electrical power from said time delay means output to the second alarm device.

10. A system as claimed in claim 1 in which said time delay means has a first output connected to said first alarm circuit and a second output and applies electrical power to said first output after electrical power has been applied to said time delay means input for a first preset time and applies power to said second output after electrical power has been applied to said time delay means input for a second preset time, and in which said system further comprises a second alarm circuit connected to said time delay means second output and adapted for connection to a second alarm device for applying power from said time delay means second output to the second alarm device.

11. A system as claimed in claim 8 further comprising an optical sensing circuit operable to monitor the operating state of said visual alarm, and a second alarm circuit responsive to said optical sensing circuit and adapted for connection to a second alarm device to apply electrical power to the second alarm device responsively to malfunction of said visual alarm.

12. A system as claimed in claim 1 in which:
said time delay means comprises a first time delay circuit having an input connected to said vibration-responsive switch and an output coupled to said first alarm circuit, for applying electrical power to said first alarm circuit after electrical power has been applied to said first time delay circuit input from said vibration-responsive switch for a first preset time; and a second time delay circuit having an input connected to said first time delay circuit output and an output, for applying electrical power to said second time delay circuit output after electrical power has been applied to said second time delay circuit input from said first time delay circuit output for a second preset time; and said system further comprises a second alarm circuit connected to said second time delay circuit output and adapted for connection to a second alarm device, for applying electrical power from said second time delay circuit output to the second alarm device.

13. A system as claimed in claim 9 further comprising a first alarm device connected to said first alarm circuit and a second alarm device connected to said second alarm device.

14. A system as claimed in claim 13 wherein the second alarm device is audio alarm.

15. A system as claimed in claim 14 wherein said second alarm circuit includes an oscillator operable to drive said second alarm device in a periodically intermittent manner to provide an audio signal during each period of intermittent operation of continuously varying frequency.

16. A system as claimed in claim 12 wherein the second preset time period is variable in the range 0 to 15 minutes.

17. A system as claimed in claim 12 wherein the first preset time period is variable in the range 0 to 15 minutes.

18. A system as claimed in claim 15 wherein the first preset time period is variable in the range 0 to 15 minutes.

19. A system as claimed in claim 1 in which said first alarm circuit includes an alarm actuator triggerable for alternately applying and removing power to the alarm device.

20. A system as claimed in claim 10 in which said alarm actuator includes an astable multivibrator.

21. A system as claimed in claim 10 wherein the first preset time period is variable in the range 0 to 15 minutes.

22. A system as claimed in claim 21 wherein the second preset time period is variable in the range 0 to 15 minutes.

23. A system as claimed in claim 17 wherein the second preset time period is variable in the range 0 to 15 minutes.

* * * * *